United States Patent
Huang et al.

(10) Patent No.: US 8,405,320 B2
(45) Date of Patent: Mar. 26, 2013

(54) CIRCUIT AND METHOD FOR CONTROLLING LIGHT EMITTING DEVICE, AND INTEGRATED CIRCUIT THEREFOR

(75) Inventors: Tsung-Wei Huang, Taipei (TW); Shui-Mu Lin, Taichung (TW); Nang-Ching Yeung, Zhubei (TW); Ti-Ti Liu, Taipei (TW); Huan-Chien Yang, New Taipei (TW)

(73) Assignee: Richtek Technology Corporation, Hsin-Chu (TW)

( * ) Notice: Subject to any disclaimer, the term of this patent is extended or adjusted under 35 U.S.C. 154(b) by 253 days.

(21) Appl. No.: 13/072,714

(22) Filed: Mar. 27, 2011

(65) Prior Publication Data
US 2011/0169423 A1 Jul. 14, 2011

Related U.S. Application Data

(63) Continuation-in-part of application No. 12/579,802, filed on Oct. 15, 2009, now Pat. No. 8,179,059.

(51) Int. Cl.
 *H05B 37/02* (2006.01)
(52) U.S. Cl. ......... 315/291; 315/192; 315/186; 315/307
(58) Field of Classification Search .................. 315/192, 315/186, 291, 294, 297, 307, 312
See application file for complete search history.

(56) References Cited

U.S. PATENT DOCUMENTS

| | | | |
|---|---|---|---|
| 8,278,830 B2* | 10/2012 | Archibald et al. | 315/209 R |
| 8,294,375 B2* | 10/2012 | Lee | 315/186 |
| 2009/0284180 A1* | 11/2009 | Shen et al. | 315/307 |
| 2010/0194308 A1* | 8/2010 | Zhao et al. | 315/297 |
| 2010/0301760 A1* | 12/2010 | Liu | 315/186 |
| 2011/0043138 A1* | 2/2011 | Hsu et al. | 315/297 |
| 2012/0081016 A1* | 4/2012 | Wu et al. | 315/192 |
| 2012/0119677 A1* | 5/2012 | Serdarevic et al. | 315/307 |
| 2012/0181939 A1* | 7/2012 | Szczeszynski et al. | 315/186 |
| 2012/0268013 A1* | 10/2012 | Riesebosch | 315/130 |

* cited by examiner

*Primary Examiner* — Don Le
(74) *Attorney, Agent, or Firm* — Tung & Associates

(57) ABSTRACT

The present invention provides a transistor switch on a light emitting device channel, the transistor switch receiving a control voltage VG. A current source circuit controls the current on the light emitting device channel, the current source circuit requiring a minimum voltage VR for normal operation. The present invention further provides a dynamic headroom controller circuit which compares a voltage VS at a current outflow end of the transistor switch with the voltage VR to determine the relationship between the voltage VS and the voltage VR when the control voltage VG is higher than a reference voltage VH, and adjusts the voltage difference between the voltage VS and the voltage VR accordingly.

24 Claims, 14 Drawing Sheets if VS<VR, increase Vout until VSmin≥VR ;
if VSmin>>VR, decrease Vout if VS<VR, increase Vout until VSmin≥VR ;
if VSmin>>VR, decrease Vout

CIRCUIT AND METHOD FOR CONTROLLING LIGHT EMITTING DEVICE, AND INTEGRATED CIRCUIT THEREFOR

CROSS-REFERENCE

The present invention is a continuation-in-part application of U.S. Ser. No. 12/579,802, filed on Oct. 15, 2009 now U.S. Pat. No. 8,179,059.

BACKGROUND OF THE INVENTION

1. Field of Invention

The present invention relates to a circuit and a method for controlling a light emitting device, and particularly to such circuit and method which are capable of reducing the pin number of an integrated circuit and are capable of dynamically adjusting the output voltage to achieve optimal power utilization. The present invention also relates to an integrated circuit for use therein.

2. Description of Related Art

Referring to FIG. 1, conventionally, a light emitting device controller circuit includes an integrated circuit 20, wherein the integrated circuit 20 includes a power stage controller circuit 21 for controlling the operation of a power transistor in a power stage circuit 60 to convert an input voltage Vin to an output voltage Vout for supplying to multiple channels of light emitting diodes (LEDs) CH1-CHn. The power stage circuit 60 for example may be, but is not limited to, synchronous or asynchronous buck converter, boost converter, buck-boost converter, inverter converter, or fly-back converter, as shown in FIGS. 2A-2G. Depending on each application, the power transistor or diode in the power stage circuit 60 may be integrated into the integrated circuit 20 in certain circumstances.

To control the brightness of each LED channel, FIG. 1 shows a current source circuit CS1 formed by an operational amplifier OP1, a transistor Q1, and a resistor R1, for controlling the current through the first LED channel CH1; a current source circuit CS2 formed by an operational amplifier OP2, a transistor Q2, and a resistor R2, for controlling the current through the second LED channel CH2; and so on. Since multiple LEDs are connected in each LED channel, the output voltage Vout is quite high; hence, the transistors Q1-Qn should be devices capable of sustaining high voltage. However, such devices can not be integrated into the integrated circuit 20, but need to be provided outside of the integrated circuit 20. Therefore, to control N LED channels, the integrated circuit 20 requires pins P1-P2N, twice the number of the channels.

In certain cases as shown in FIG. 3, it is required to obtain the drain signals of the transistors Q1-Qn; however, to connect these nodes to the integrated circuit 20 further increases the pin number to three times of the channel number.

In view of the foregoing, the present invention provides a circuit and a method for controlling a light emitting device, with which the pin number of the integrated circuit is reduced.

In addition, the present invention also provides a circuit and a method for controlling a light emitting device, with which the output voltage is dynamically adjusted to achieve optimal power utilization.

SUMMARY OF THE INVENTION

An objective of the present invention is to provide a light emitting device controller circuit.

Another objective of the present invention is to provide a method for controlling a light emitting device.

Yet another objective of the present invention is to provide an integrated circuit for use in a light emitting device controller circuit.

To achieve the foregoing objectives, in one perspective of the present invention, it provides a light emitting device controller circuit comprising: a power stage controller circuit controlling a power stage circuit to convert an input voltage to an output voltage, the output voltage being supplied to at least one light emitting device channel which includes at least one light emitting device; a transistor switch in the light emitting device channel, the transistor switch receiving a control voltage VG; a current source circuit controlling a current through the light emitting device channel, the current source requiring a minimum operation voltage VR for normal operation; and a dynamic headroom controller circuit comparing a voltage VS at a current outflow end of the transistor switch and the voltage VR to determine a relationship between the voltage VS and the voltage VR when the control voltage VG is higher than a reference voltage VH, so that a control signal is generated for controlling the power stage controller circuit to adjust the output voltage.

In another perspective of the present invention, it provides an integrated circuit for use in a light emitting device controller circuit which controls at least one light emitting device channel, the channel including at least one light emitting device and one transistor switch coupled to the light emitting device, the transistor switch receiving a control voltage VG, wherein the light emitting device controller circuit includes a power stage circuit, the integrated circuit comprising: a power stage controller circuit controlling the power stage circuit to convert an input voltage to an output voltage supplied to the at least one light emitting device channel; and a current source circuit controlling a current through the light emitting device channel the current source requiring a minimum operation voltage VR for normal operation; and a dynamic headroom controller circuit comparing a voltage VS at a current outflow end of the transistor switch and the voltage VR to determine a relationship between the voltage VS and the voltage VR when the control voltage VG is higher than a reference voltage VH, so that a control signal is generated for controlling the power stage controller circuit to adjust the output voltage.

In one embodiment of the foregoing light emitting device controller circuit or integrated circuit, the dynamic headroom controller circuit may include: a minimum selector selecting a minimum voltage from the voltages VS at the current outflow ends of the transistor switches in the light emitting device channels; a comparator comparing the minimum voltage selected by the minimum selector with the voltage VR; a counter counting the comparison result of the comparator; and a digital-to-analog converter converting the count by the counter to the control signal for controlling the power stage controller circuit.

In one embodiment of the foregoing light emitting device controller circuit or integrated circuit, the dynamic headroom controller circuit may include: a minimum selector selecting a minimum voltage from the voltages VS at the current outflow ends of the transistor switches in the light emitting device channels; a comparator comparing the minimum voltage selected by the minimum selector with the voltage VR; and a low-pass filter converting the count by the counter to the control signal for controlling the power stage controller circuit.

In one embodiment of the foregoing light emitting device controller circuit, the dynamic headroom controller circuit may further comprise a short circuit detection circuit for comparing the voltage VS at the current outflow end of the transistor switch with the reference voltage VH to determine whether a short circuit occurs in the light emitting device channel.

When the output voltage is provided to at least two light emitting device channels, the light emitting device controller circuit or the integrated circuit may further include a voltage controller circuit providing the control voltage VG respectively to the transistor switches on the light emitting device channels, wherein when a short circuit occurs in any one of the light emitting device channels, the voltage controller circuit turns off the corresponding transistor switch in the short-circuited light emitting device channel.

In one embodiment of the foregoing light emitting device controller circuit or integrated circuit, the dynamic headroom controller circuit may include: an open circuit detection circuit for comparing a voltage VD at a current inflow end of the transistor switch with the voltage VR to determine whether an open circuit occurs in the light emitting device channel.

In yet another perspective of the present invention, it provides a method for controlling a light emitting device in a light emitting device channel, and the method includes: providing a transistor switch in the light emitting device channel, the transistor switch receiving a control voltage VG; providing a current source circuit in the integrated to control a current through the light emitting device channel, the current source requiring a minimum operation voltage VR for normal operation; causing the control voltage VG to be higher than a reference voltage VH; determining a relationship between a voltage VS at a current outflow end of the transistor switch and the voltage VR; and adjusting a voltage supplied to the light emitting device channel according to the determination result.

The objectives, technical details, features, and effects of the present invention will be better understood with regard to the detailed description of the embodiments below, with reference to the drawings.

DESCRIPTION OF THE PREFERRED EMBODIMENTS

Figure 1:
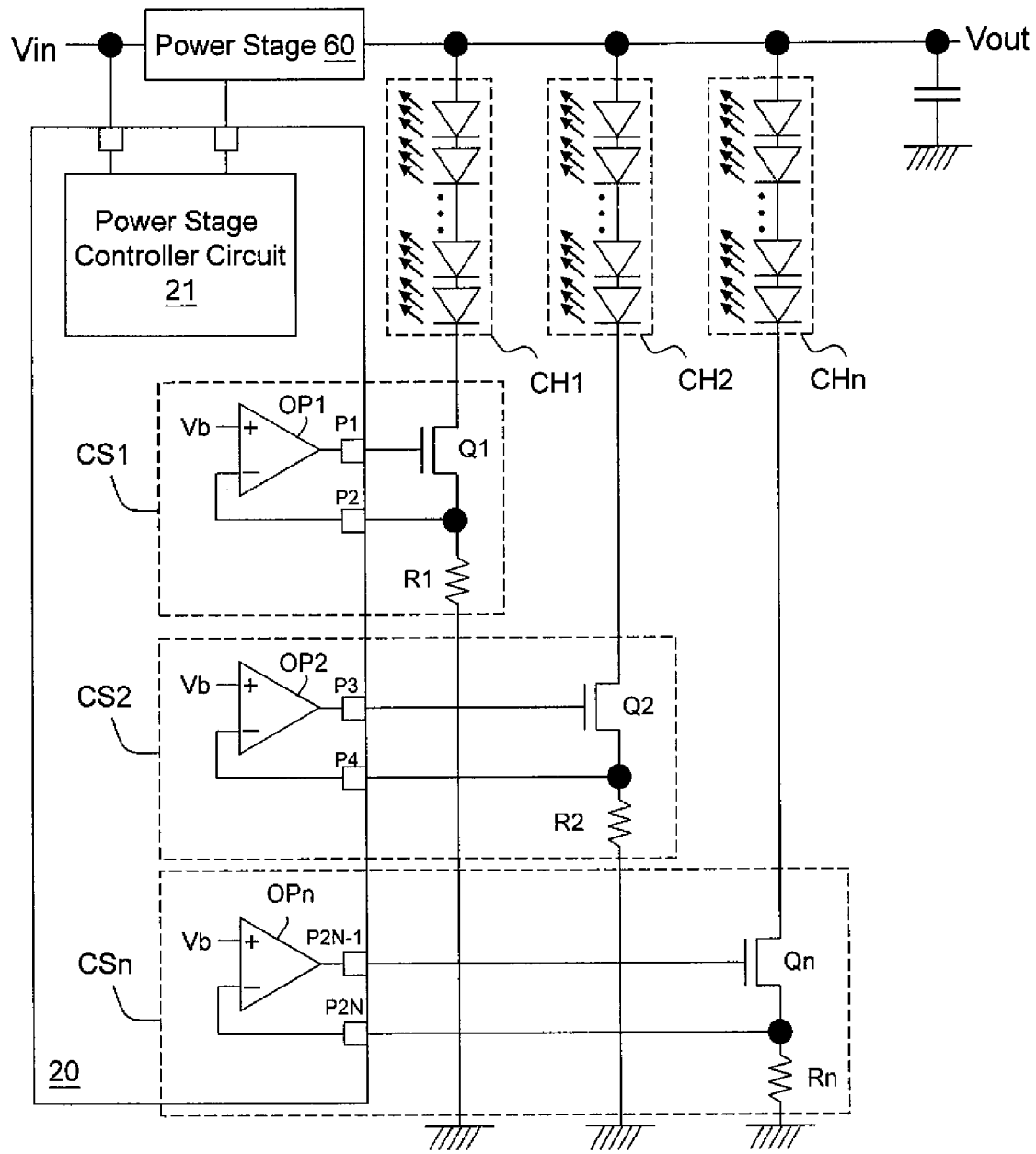
FIG. 1 illustrates a prior art light emitting device controller circuit.
Figure 2A:
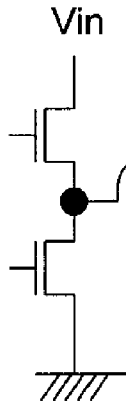
FIGS. 2A-2G illustrate several embodiments of a power stage circuit 60.
Figure 2B:
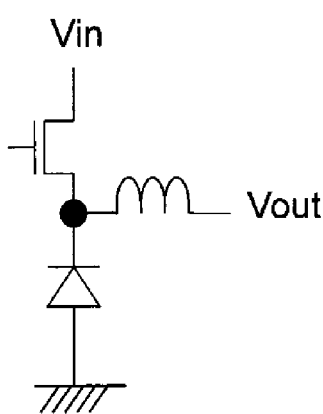
Figure 2C:
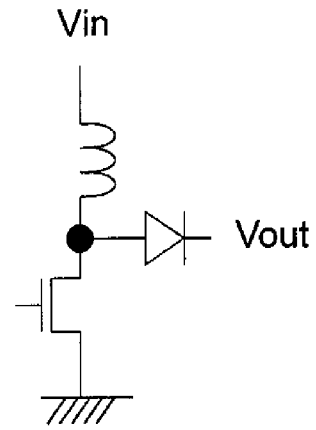
Figure 2D:
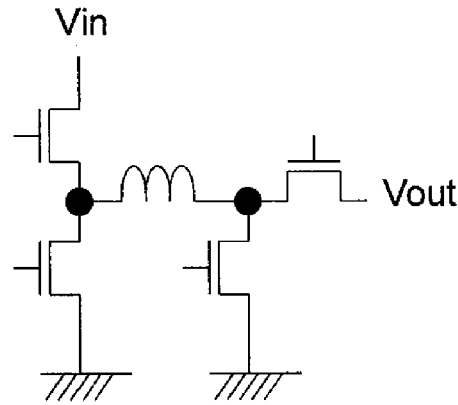
Figure 2E:
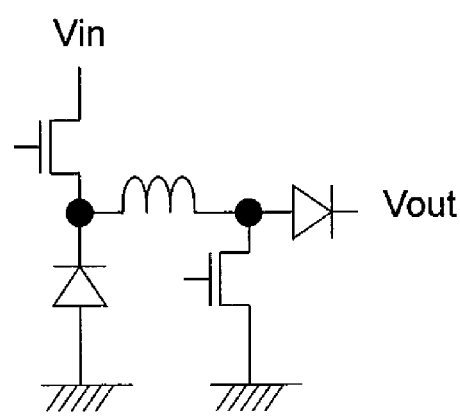
Figure 2F:
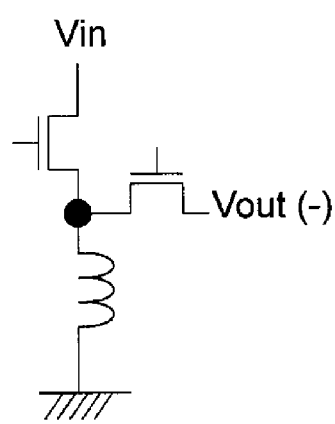
Figure 2G:
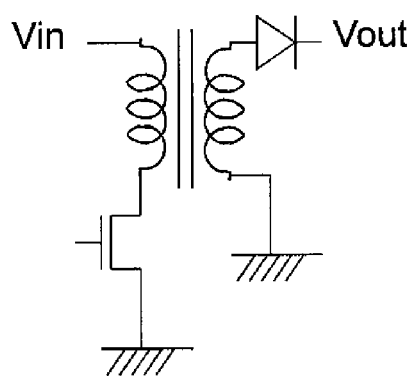
Figure 3:
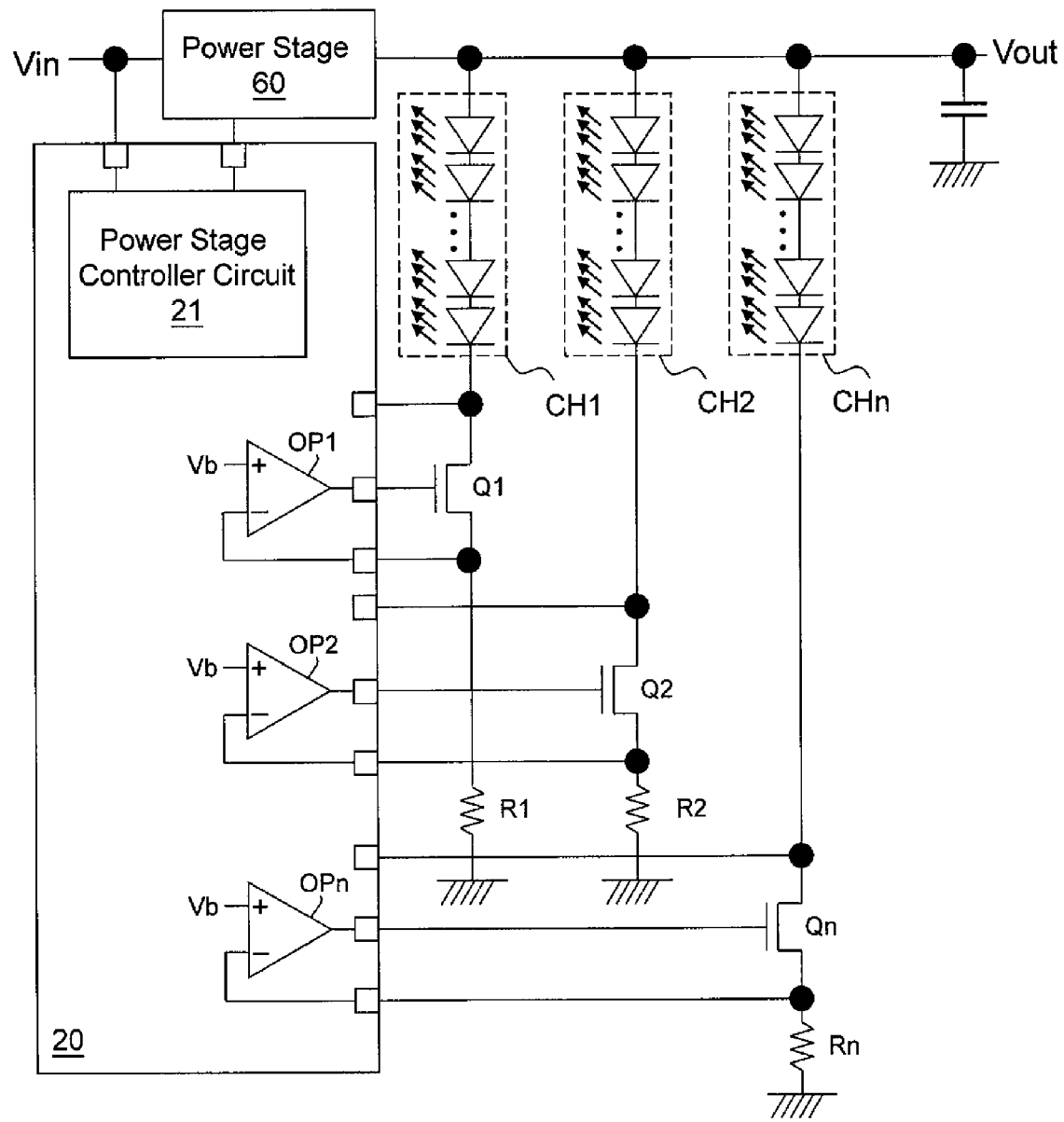
FIG. 3 shows another prior art light emitting device controller circuit.
Figure 4:
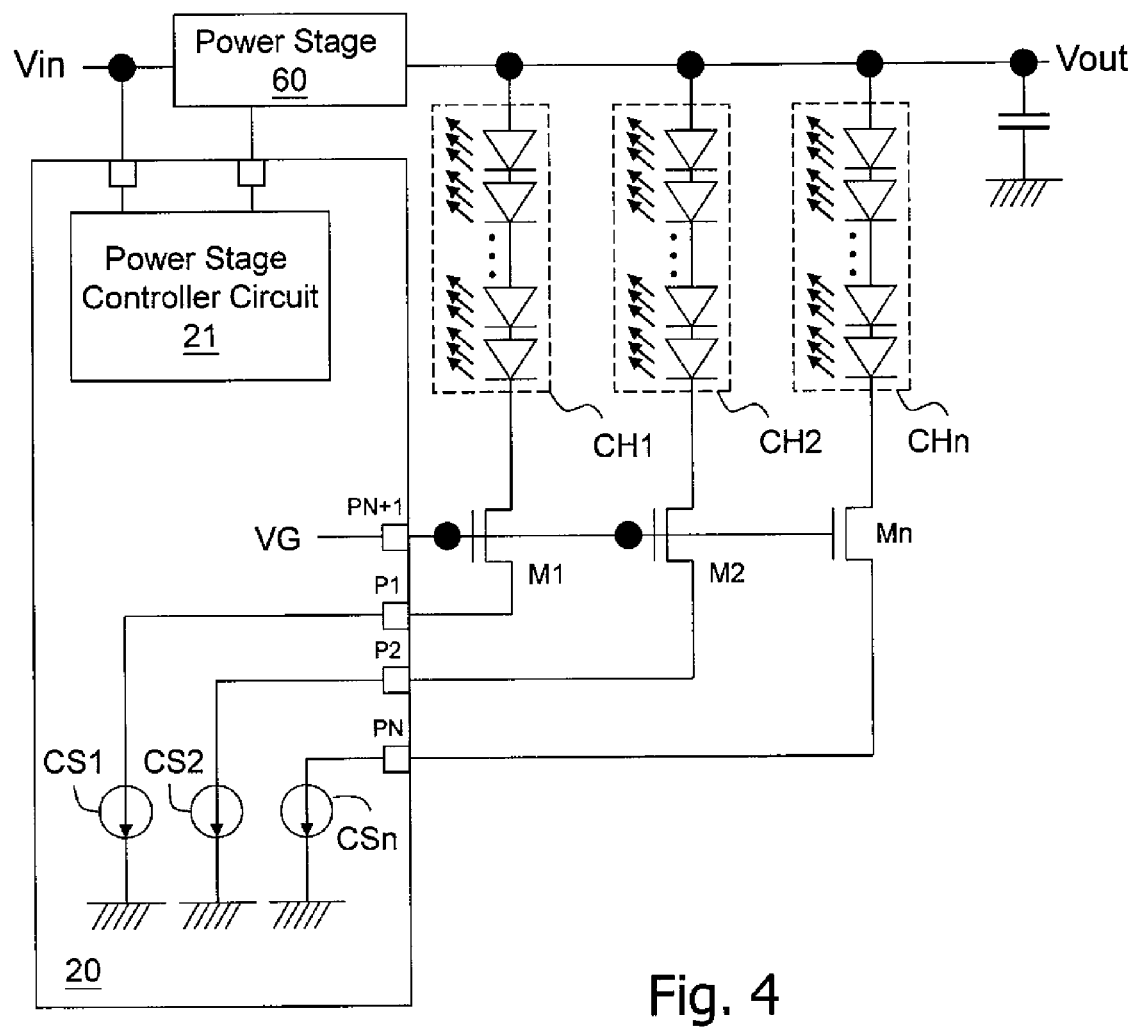
FIG. 4 shows an embodiment of a light emitting device controller circuit of the present invention.

FIG. 4 shows the first embodiment of the present invention. The present invention integrates current source circuits CS1-CSn into the integrated circuit 20, and provides transistor switches M1-Mn in the LED channel CH1-CHn, respectively, wherein the gates of these transistor switches M1-Mn are controlled by a voltage VG. The voltage VG for example can be a constant voltage or a periodical square-wave signal. When the voltage VG is a square-wave signal, the average current of each LED channel can be adjusted according to the duty ratio of the voltage VG, that is, to adjust the brightness of the LED by the duty ratio of the voltage VG. Because the gate voltage of each transistor switch M1-Mn is VG, the highest voltage at the source of each transistor switch M1-Mn will not be higher than VG. Thus, the transistor switches M1-Mn provide a function to block high voltage, such that the devices forming the current source circuits CS1-CSn can be made of low voltage devices which can be integrated in the integrated circuit 20. As shown in the drawing, to control N LED channels, the integrated circuit 20 according to the present invention only requires N+1 pins, the number being far less than that shown in FIG. 1 or 3.

Figure 5:
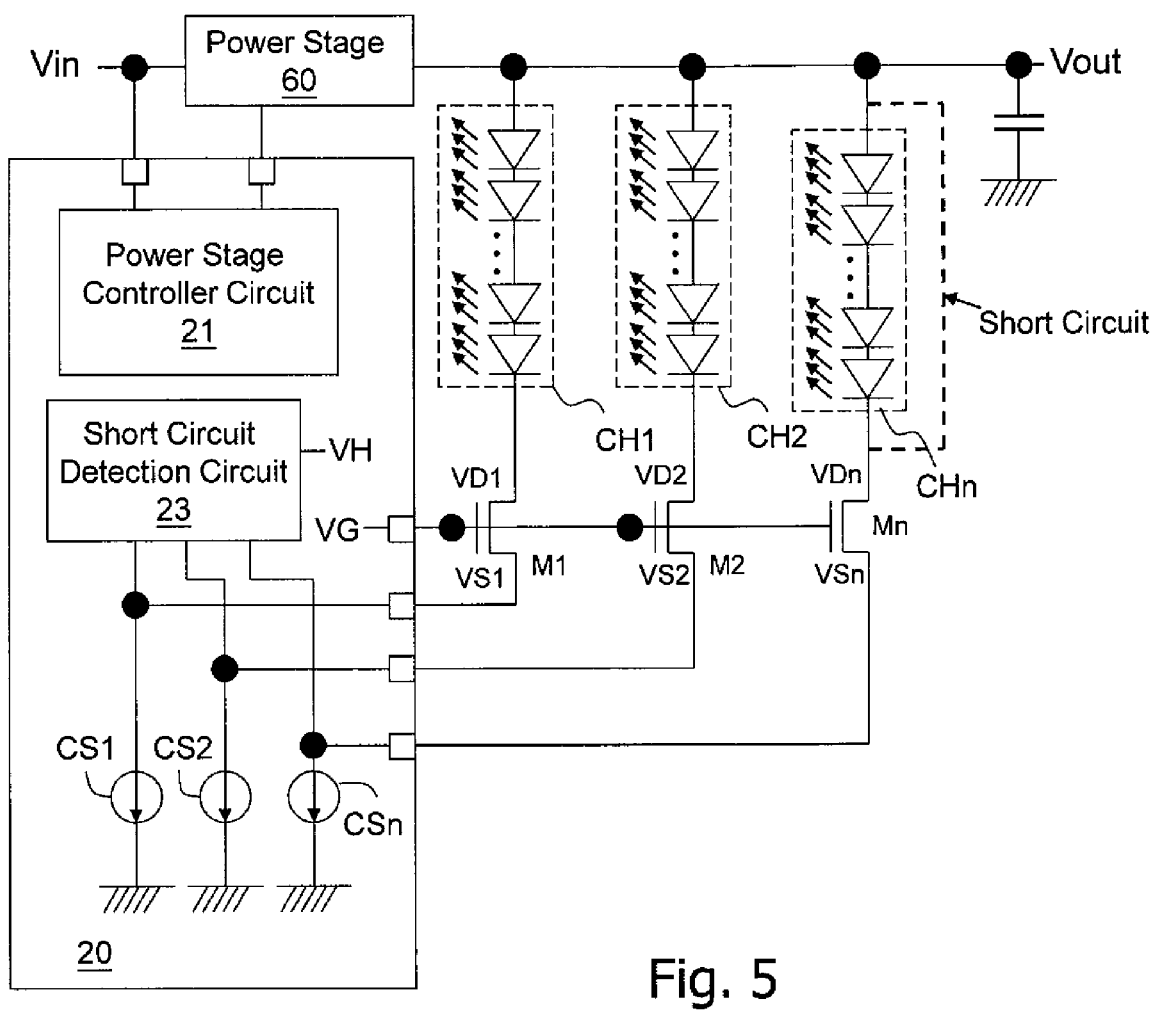
FIG. 5 shows another embodiment of a light emitting device controller circuit of the present invention.

FIG. 5 shows another embodiment of the present invention. In this embodiment, a short circuit detection circuit 23 is further provided to detect whether a short circuit occurs in each LED channel. As shown in the drawing, to detect whether a short circuit occurs in an LED channel, it is not required to provide one or more additional pins to obtain a signal from outside of the integrated circuit 20; the drain voltage of a corresponding transistor switch M1-Mn can be obtained from inside of the integrated circuit 20.

Figure 6:
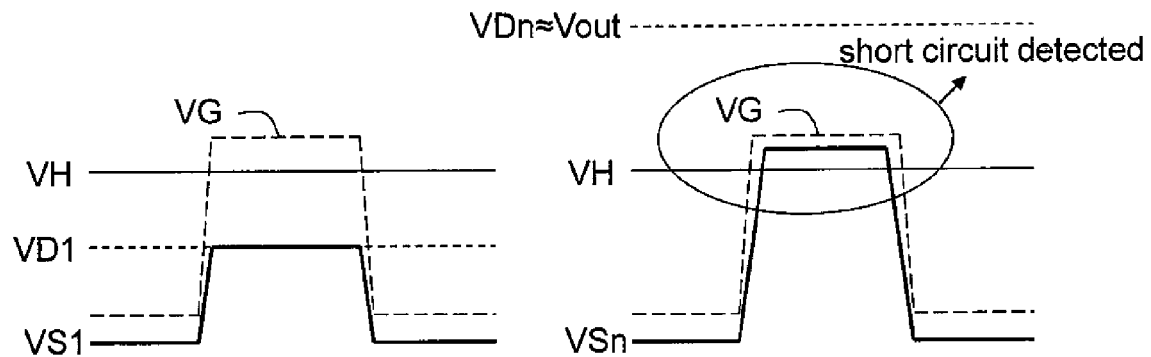
FIG. 6 illustrates an example of short circuit detection.

Referring to FIGS. 5 and 6, an example is given for illustrating how to determine that a short circuit occurs in an LED channel, according to the source voltage of the corresponding transistor switch M1-Mn. In any LED channel in conduction, the drain voltage VD1-VDn of the corresponding transistor switch M1-Mn is equal to the difference obtained by subtracting a sum of the voltages of all LEDs in the LED channel from the input voltage Vin; the source voltage VS1-VSn of the corresponding transistor switch M1-Mn is equal to the difference obtained by subtracting a transistor threshold voltage VT from VG. If the voltage VG increases, the source voltages VS1-VSn will increase accordingly until the source voltages VS1-VSn are about equal to the drain voltages VD1-VDn.

From this point on, the source voltages VS1-VSn are clamped at the drain voltages VD1-VDn, and do not follow the increase of VG.

Referring to FIG. 5 and FIG. 6, assuming that the first LED channel CH1 is under normal operation but a short circuit occurs in the n-th LED channel CHn, because of the short circuit, the drain voltage VDn is about equal to the output voltage Vout, far higher than the drain voltage VD1 under normal operation. As such, a reference voltage VH can be set at any level between the normal drain voltage and the output voltage Vout, and the short circuit can be detected by increasing the voltage VG to a level higher than this reference voltage VH. As mentioned earlier, when the voltage VG increases, the source voltages of the transistor switches M1-Mn increase accordingly, but their highest level can at most be about equal to the corresponding drain voltages. Hence, in the first LED channel under normal operation, the voltage VS1 is clamped at the drain voltage VD1, which is lower than the reference voltage VH; while in the n-th LED channel CHn where a short circuit occurs, the voltage VSn is higher than the reference voltage VH. In this way, the short circuit detection circuit 23 can obtain short circuit information relating to an LED channel by a comparator comparing the reference voltage VH with the source voltage VS1-VSn of the corresponding transistor switch M1-Mn.

Figure 7:
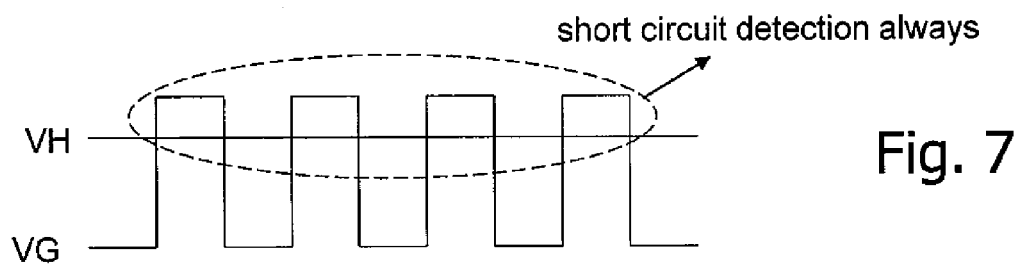
FIGS. 7-9 illustrate several methods for short circuit detection.
Figure 8:
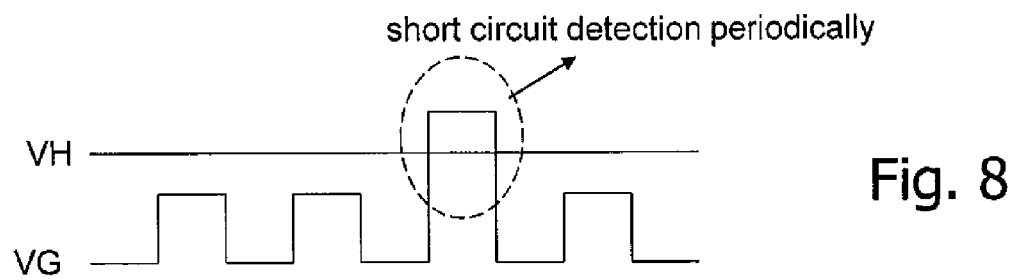
Figure 9:
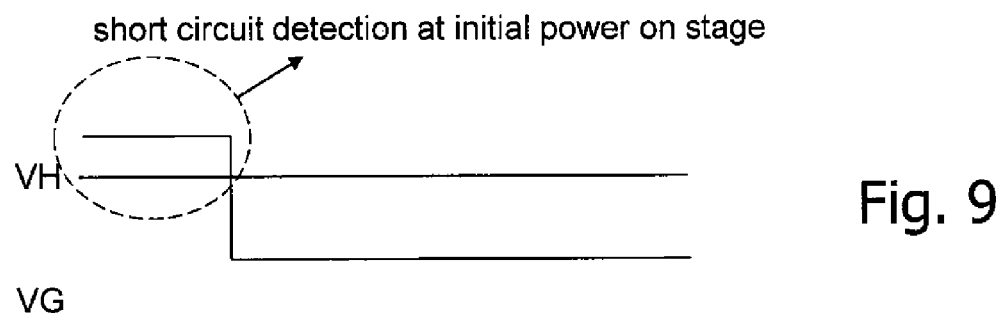

The detection to determine whether a short circuit occurs in the LED channels can be performed always or periodically. Referring to FIGS. 7 and 8, when the voltage VG is a square-wave signal, the short circuit detection can be always performed by setting the high level of the voltage VG to be always higher than the reference voltage VH. Or, the short circuit detection can be performed periodically by pulling the voltage VG higher than the reference voltage VH every several cycles. Or, the short circuit detection can be performed only once at the initial power on stage. When the voltage VG is a constant voltage, the short voltage detection can be always performed by keeping the constant voltage higher than the reference voltage VH. Or, referring to FIG. 9 as an example, the short voltage detection can be performed only once at the initial power on stage where the voltage VG is set higher than the reference voltage VH, and then the voltage VG drops to be a constant voltage lower than the reference voltage VH.

Referring to FIG. 5, when the circuit is under normal operation and not performing short circuit detection, the voltage VG should be lower than the reference voltage VH, and the source voltage VS1-VSn of the transistor switch M1-Mn in any one of the LED channels CH1-CHn should be higher than a voltage VR which is a minimum voltage required for normal operation of the current source circuits CS1-CSn. Thus, under normal operation, there should be the following relationship:

$$VR \leq VS < VG < VH,$$

where VS represents any one of the source voltages VS1-VSn.

Figure 10:
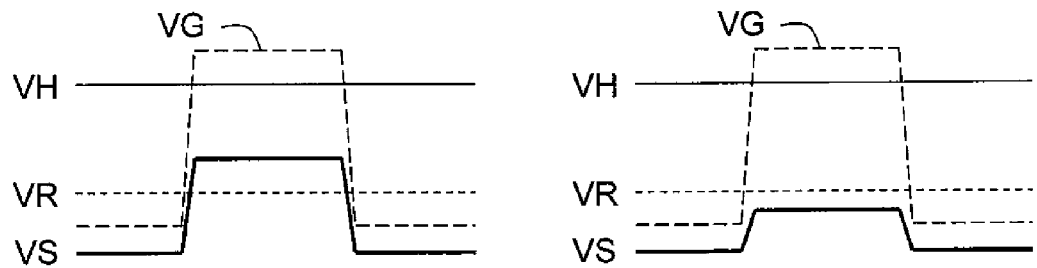
FIG. 10 shows a case where the output voltage Vout is sufficient (left side) and a case where the output voltage Vout is insufficient (right side), respectively.

On the other hand, when the voltage VS (any one of the source voltages VS1-VSn) is lower than the voltage VR, the corresponding current source circuit CS1-CSn would not operate normally. This means that the LED devices in the corresponding LED channel CH1-CHn have a higher voltage drop so that the corresponding source voltage VS1-VSn is too low; in other words, the output voltage Vout is insufficient and required to be increased. FIG. 10 shows a case where the output voltage Vout is sufficient (left side) and a case where the output voltage Vout is insufficient (right side), respectively. Because the source voltage VS1-VSn is equal to the difference obtained by subtracting a threshold voltage VT of the transistor from the gate voltage VG, it is also possible that the low source voltage VS1-VSn is because of an insufficient gate voltage VG. Thus, when detecting whether the output voltage Vout is insufficient, preferably, the voltage VG should be pulled high, for example but not limited to higher than the reference voltage VH, to avoid misjudgment.

According to the above, the present invention proposes a dynamic headroom adjustment mechanism, that is, when the voltage VG is pulled high to perform the short circuit detection as shown in FIG. 6 (to detect whether the drain voltage VD1-VDn is higher than a normal voltage), the present invention also determines whether the output voltage Vout is insufficient by detecting whether the source voltage VS1-VSn is too low. When any one of the source voltages VS1-VSn is too low, by feedback control mechanism, the power stage circuit 60 is controlled to increase the output voltage Vout until every source voltage VS1-VSn is higher than the voltage VR. Further, as the voltage VG is pulled high, if the drain voltage VD1-VDn keeps lower than the voltage VR (or is equal to the source voltage VS1-VSn), it means that the corresponding LED channel is open-circuited.

Accordingly, three determination mechanisms are established:
(1) When (VG>VH) and (VD>VH or VS>VH), the corresponding LED channel is short-circuited.
(2) When (VG>VH) and (VS<VR), the output voltage Vout is insufficient.
(3) When (VG>VH) and (VD<VR or VD=VS), the corresponding LED channel is open-circuited.
In the above, VS represents any one of the source voltages VS1-VSn and VD represents any one of the drain voltages VD1-VDn.

Figure 11:
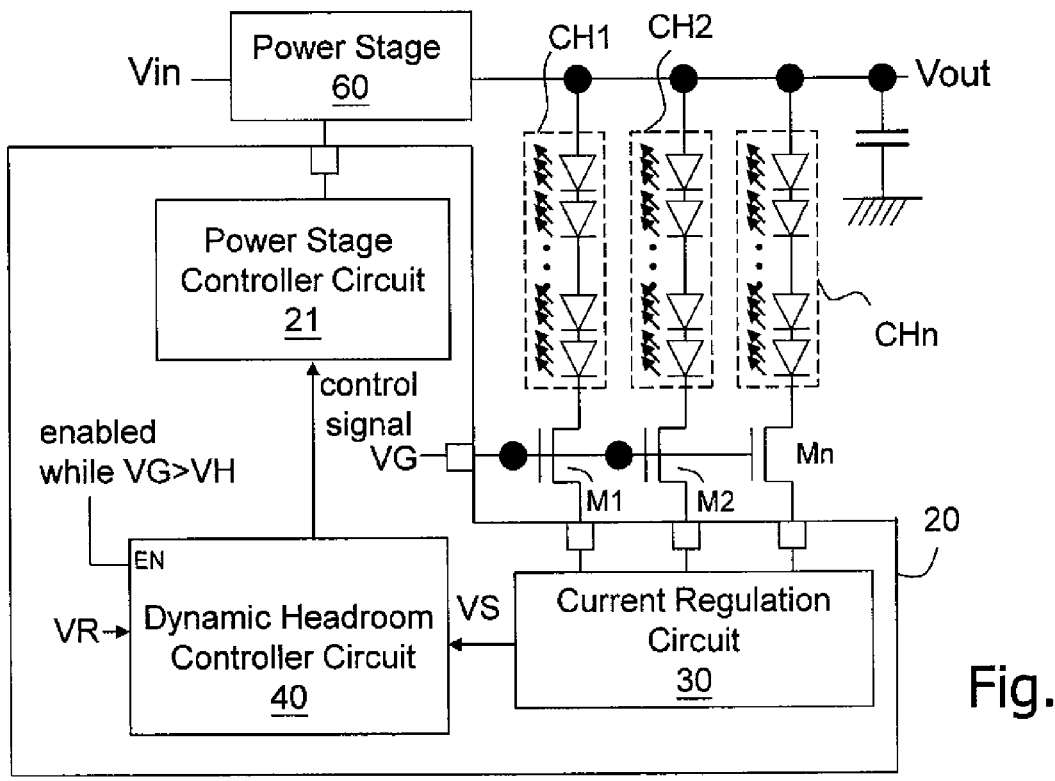
FIG. 11 shows another embodiment of the present invention, wherein a voltage difference between a voltage VS and a voltage VR is dynamically adjusted.

The determination mechanism (2) can be used to feed back control the output voltage, as described below. Please refer to FIG. 11 for the basic concept, the current sources CS1-CSn controlling currents of the LEDs are collectively expressed as a current regulation circuit 30. The source voltages VS1-VSn are available from the current regulation circuit 30 (VS represents any one of the source voltages VS1-VSn), and the minimum voltage VR required for the current sources CS1-CSn to operate normally is known. Thus, based on the determination mechanism (2), a dynamic headroom controller circuit 40 determines whether any source voltage VS is too low when VG>VH, and if yes, it controls the power stage circuit 60 to increase the output voltage Vout until every source voltage VS is equal to or higher than the voltage VR and the lowest one of the source voltages VS (represented by VSmin) is approximately equal to or slightly higher than the voltage VR. On the other hand, when all the source voltages VS are higher than the minimum voltage VR, the output voltage Vout may be too high and not optimal in terms of power utilization efficiency. In this case, the dynamic headroom controller circuit 40 can control the power stage circuit 60 to decrease the output voltage Vout until the voltage VSmin is approximately equal to or slightly higher than the voltage VR. In other words, the dynamic headroom controller circuit 90 can dynamically adjust the relationship between the voltage VS and the voltage VR so that their voltage difference is an optimal minimum for best power utilization efficiency.

It is drawn in the figure that the dynamic headroom controller circuit 40 receives the voltage VS and the voltage VR, but this is just an abstract expression of the concept; it only means that the dynamic headroom controller circuit 40 receives information relating to the voltages VR and VS, but does not mean that the dynamic headroom controller circuit 40 has to receive analog voltages substantially equal to the voltages VR and VS. For instance, the dynamic headroom controller circuit 90 can compare the voltages VR and VS in digital form, or compare fractions of the voltages VR and VS in analog form. And because the voltage VR is a known value, it can be set in the dynamic headroom controller circuit 40 as a reference voltage; that is, the voltage VR is not necessarily obtained from outside of the dynamic headroom controller circuit 40. Further, the figure also shows that the dynamic voltage headroom controller circuit 40 is enabled when VG>VH. It only means that the dynamic headroom controller circuit 40 executes the determination mechanism when VG>VH, but does not mean that the dynamic headroom controller circuit 40 must have an enable switch EN. There are many other equivalent ways to achieve the same function, such as, providing the output signal of the dynamic headroom controller circuit 40 to the power stage controller circuit 21 only when VG>VH, or, generating a signal when VG>VH and performing a logic operation with the signal in the dynamic headroom controller circuit 90, etc.

Figure 12:
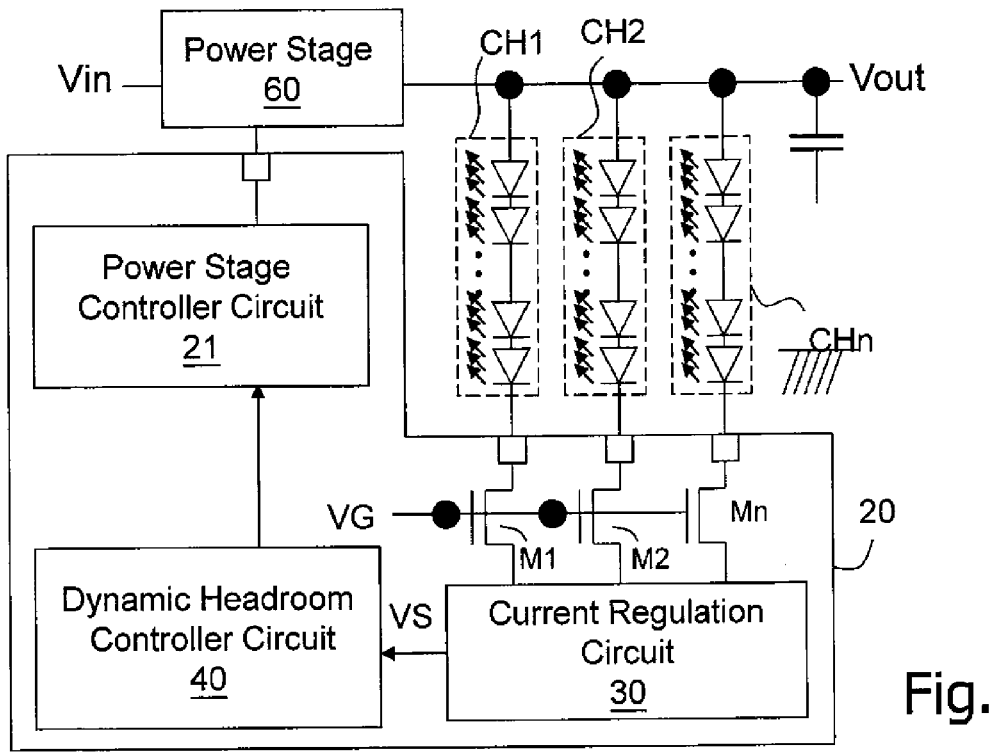
FIGS. 12-14 show three other embodiments which can dynamically adjust the voltage difference.
Figure 13:
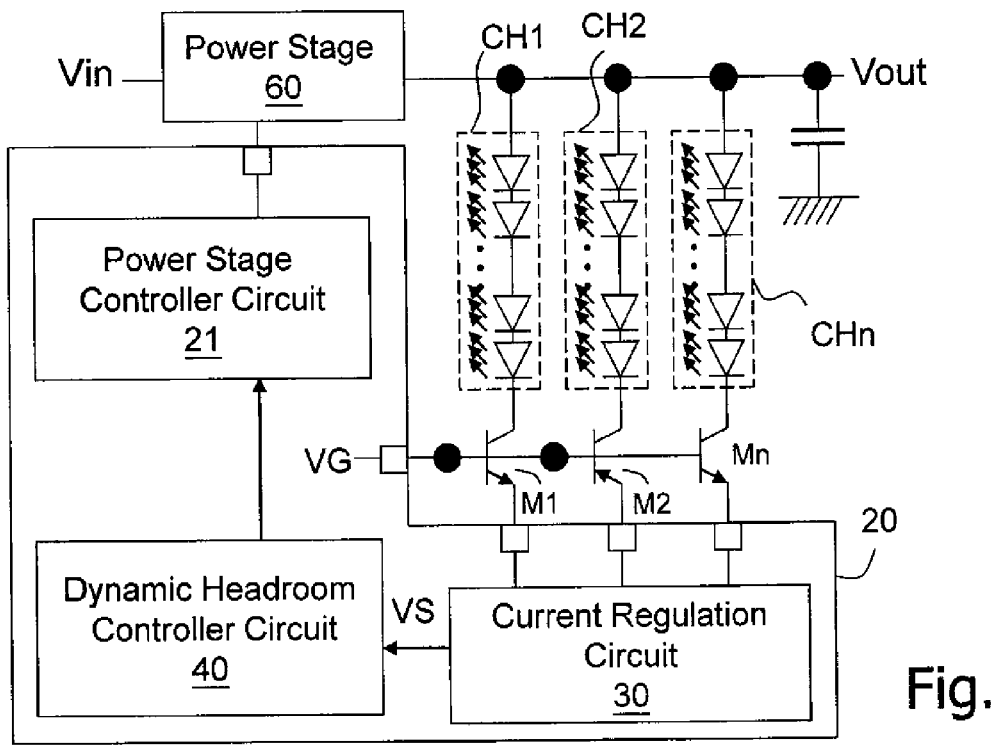
Figure 14:
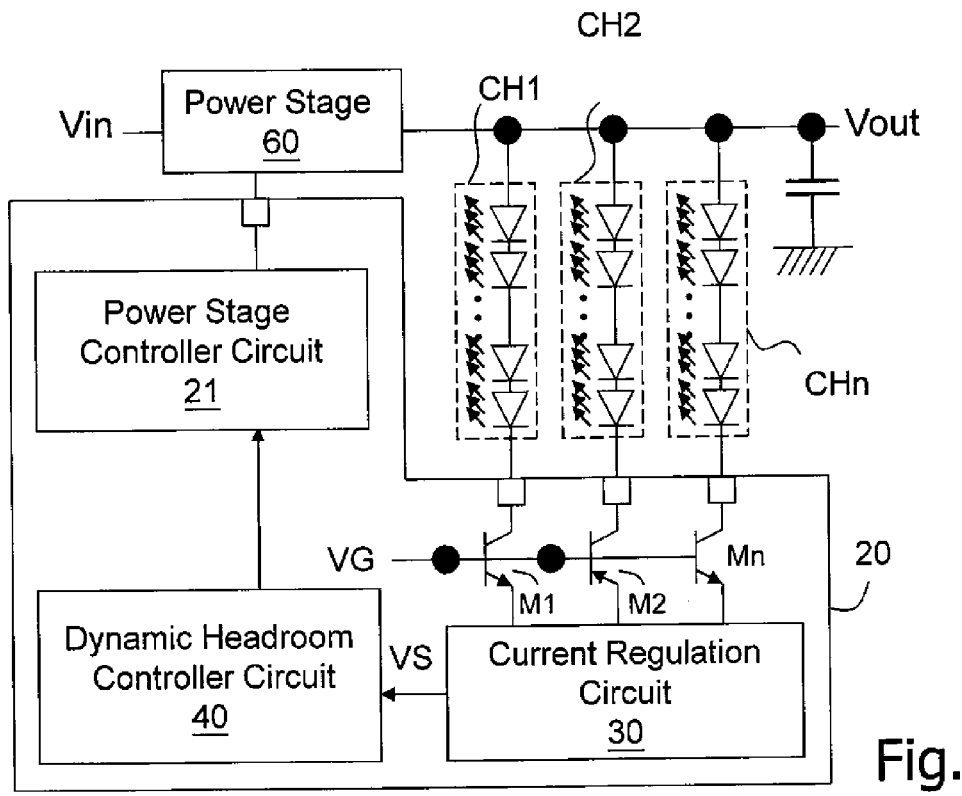

In addition, the foregoing determination and feedback control mechanism can be applied not only to a case where the transistors M1-Mn are placed outside the integrated circuit, but also applicable to such application where the transistors M1-Mn are inside the integrated circuit, as shown in FIG. 12. Further, the transistors M1-Mn are not limited to MOS transistors, but also can be bipolar junction transistors, as shown in FIGS. 13-19; in this case the voltage VS represents an emitter voltage of the bipolar junction transistor, that is, regardless whether the transistors are MOS transistors or bipolar junction transistors, the voltage VS represents the voltage at the current outflow end of the transistor M1-Mn; the voltage VG shown in FIG. 6 represents the control voltage of the transistor M1-Mn; and the voltage VD shown in FIG. 6 represents the voltage at the current inflow end of the transistor M1-Mn.

Figure 15:
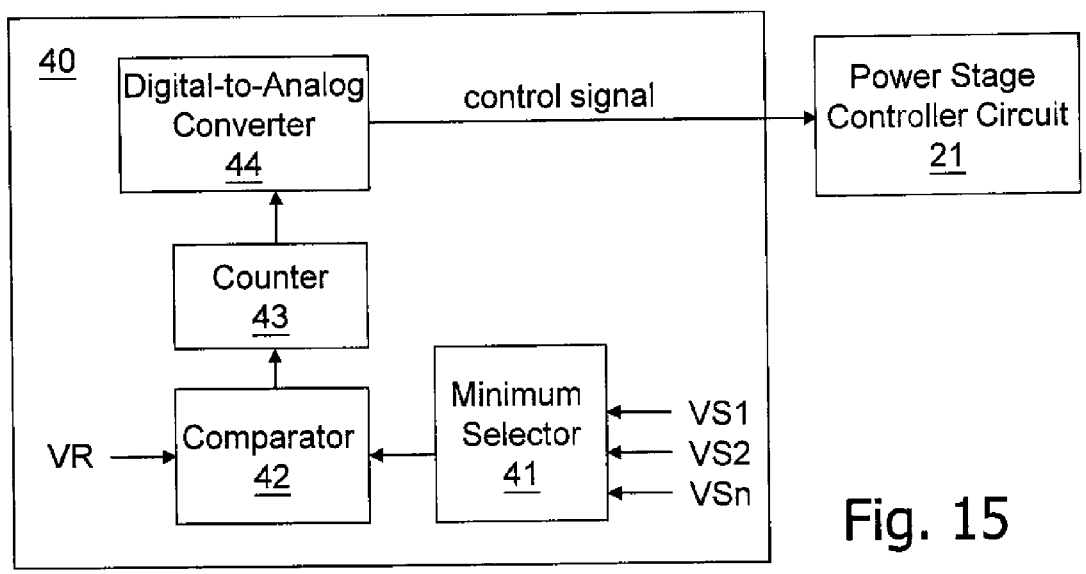
FIG. 15 shows an embodiment of the dynamic headroom controller circuit 40 of the present invention.

An embodiment of the dynamic headroom controller circuit 40 is shown in FIG. 15, wherein the dynamic headroom controller circuit 40 includes a minimum selector 41, a comparator 42, a counter 43 and a digital-to-analog converter 44. The minimum selector 41 selects the lowest voltage VSmin from the voltages VS1-VSn and sends it to the comparator 42 to compare it with the voltage VR. The comparison result is counted by the counter 43 and is converted to an analog control signal by the digital-to-analog converter 44; the control signal is provided to the power stage controller circuit 21 to control the output voltage Vout. In this way, the output voltage Vout is adjusted according to the difference between the lowest voltage VSmin and the voltage VR. In the circuit, the comparator 42 is preferably a hysteresis comparator, but it also can be a general comparator. The counter 43 is preferably an up/down counter.

Figure 16:
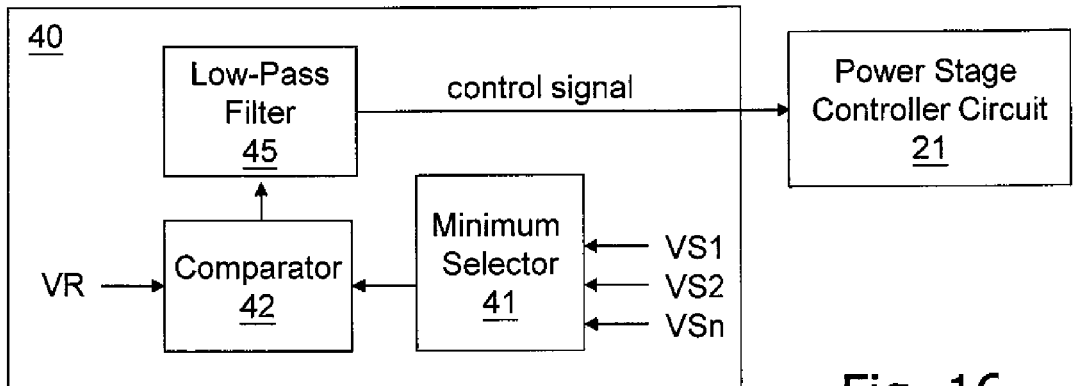
FIG. 16 shows another embodiment of the dynamic headroom controller circuit 40 of the present invention.

FIG. 16 shows another embodiment of the dynamic headroom controller circuit 40, wherein the counter 43 and the digital-to-analog converter 44 are replaced by a low-pass filter 45, which also can convert the output of the comparator 42 to an analog control signal, and provide the control signal to the power stage controller circuit 21 to control the output voltage Vout.

Figure 17:
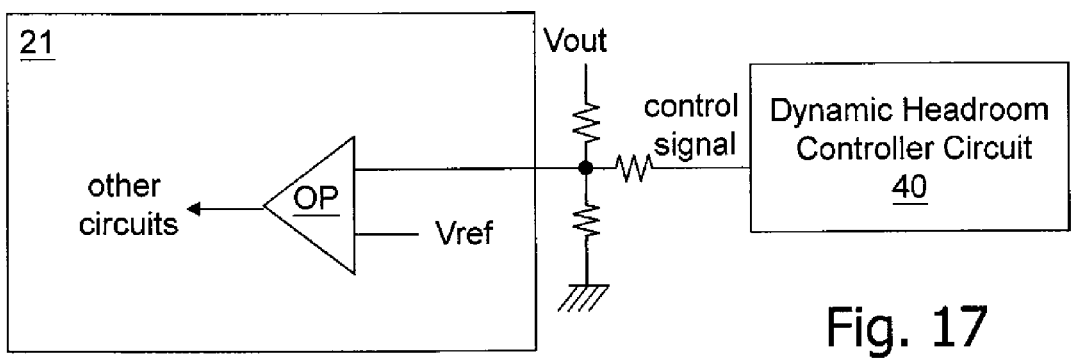
FIGS. 17-18 show examples as to how the control signal from the dynamic headroom controller circuit 40 is provided to the power stage controller circuit 21 to control the output voltage Vout.
Figure 18:
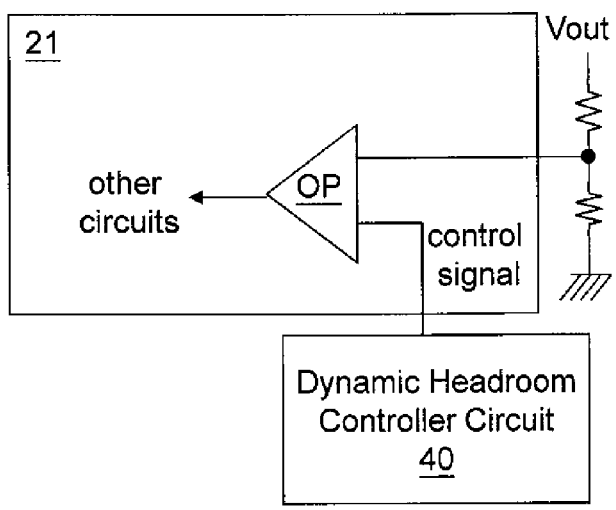

The control signal from the dynamic headroom controller circuit 40 can be utilized by the power stage controller circuit 21 in various ways to adjust the output voltage Vout. For example, if the power stage controller circuit 21 receives a divided voltage of the output voltage Vout as a feedback signal and compares the feedback signal with a reference voltage by an operational amplifier to perform modulation control, then as shown in FIG. 17, the control signal from the dynamic headroom controller circuit 40 can be coupled to a node providing the feedback signal, and the node is connected to an input of the operational amplifier OP which compares the input with the reference voltage Vref to perform modulation control. Or, as shown in FIG. 18, the control signal from the dynamic headroom controller circuit 40 can be provided as a reference voltage to be compared with the feedback signal. (Other circuits in the power stage controller circuit 21 are well known by one skilled in this field, so they are omitted for simplicity of the drawings.)

Figure 19:
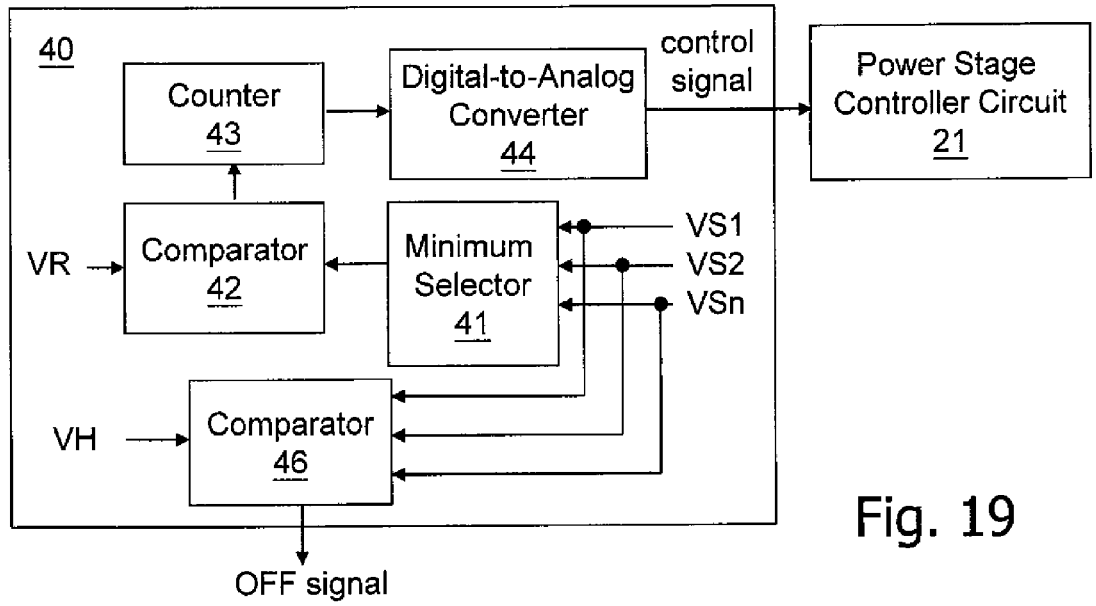
FIG. 19 shows that the dynamic headroom controller circuit 40 may further comprise a comparator 46 to determine whether a short circuit occurs in any LED string.
Figure 20:
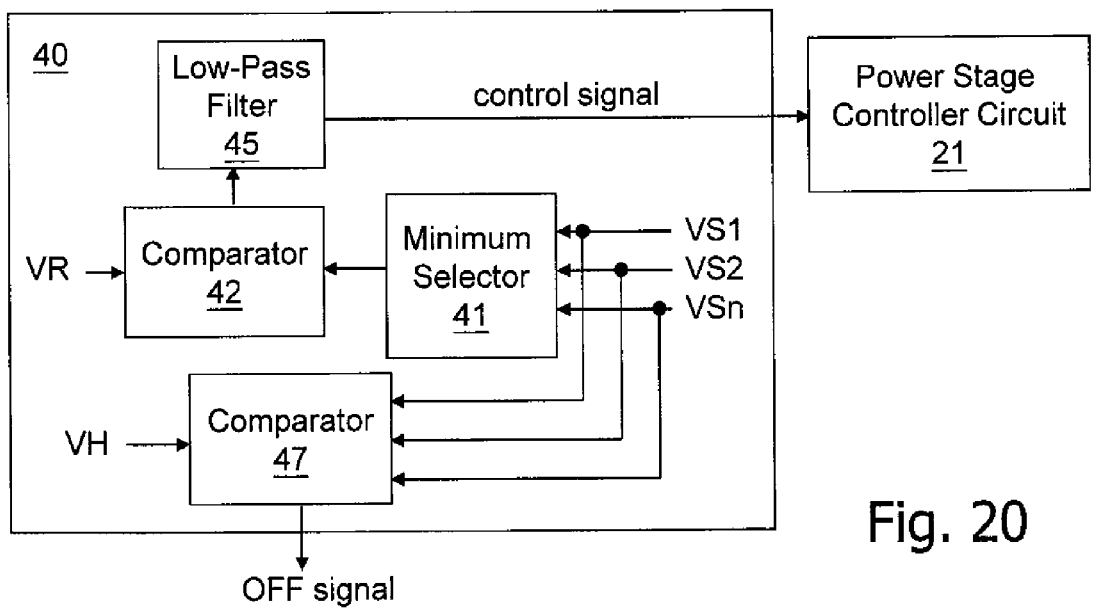
FIG. 20 shows another embodiment of the dynamic headroom controller circuit 40 of the present invention.

Besides dynamically controlling the voltage difference between the voltage VS and the voltage VR, the dynamic headroom controller circuit 40 also can determine whether a short circuit occurs in each LED string according to the determination mechanism (1). Referring to FIG. 19, the dynamic headroom controller circuit 40 may further include a short circuit detection circuit 46, one embodiment of which is a comparator, for comparing the voltage VS1-VSn with the voltage VH, wherein when one or more source voltages VS1-VSn are higher than the voltage VH, an OFF signal is generated to stop providing the output voltage Vout, or to disconnect the corresponding LED channel(s). Similarly, the circuit of FIG. 16 also can include this function, as shown in FIG. 20.

Figure 21:
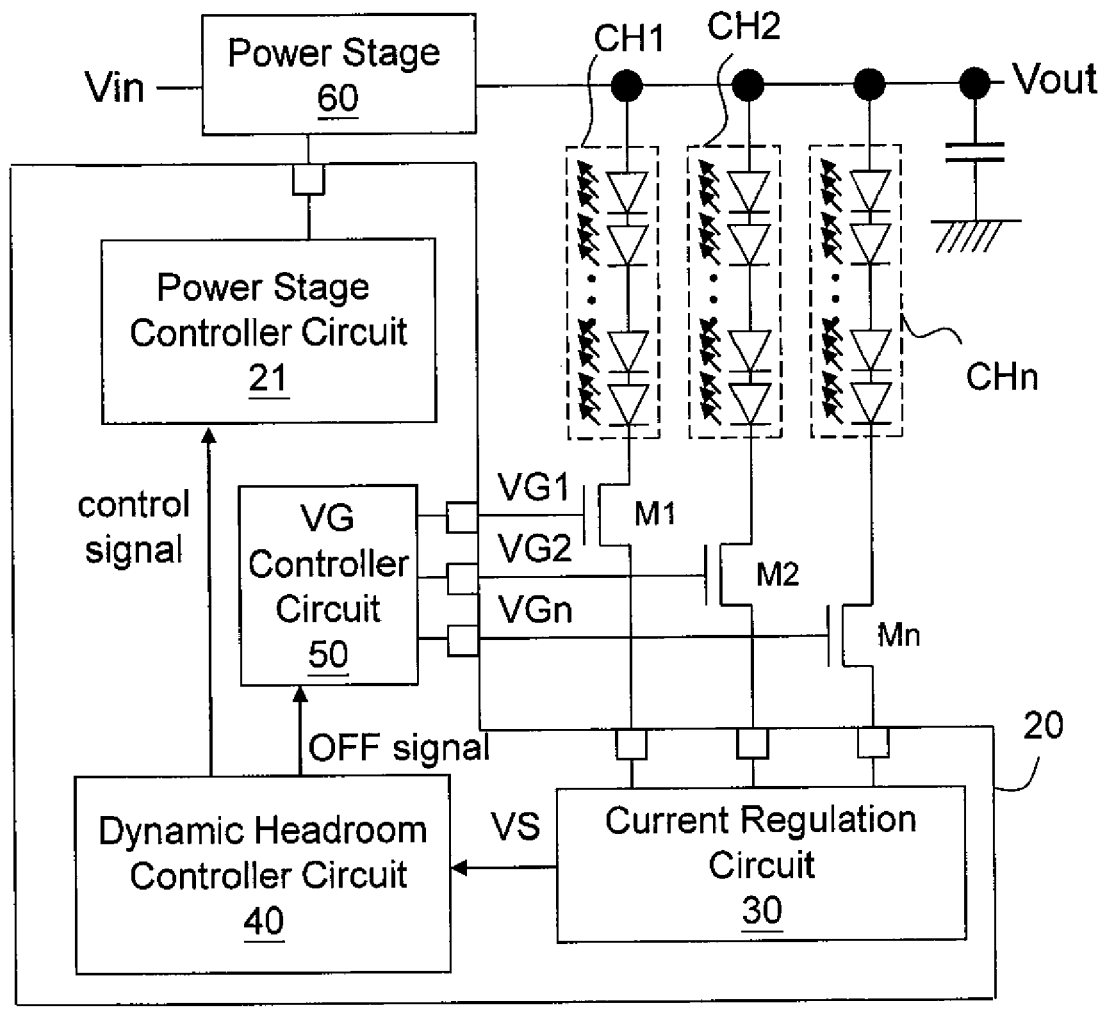
FIG. 21 shows another embodiment of a light emitting device controller circuit of the present invention, wherein a VG controller circuit 50 controls the transistor M1-Mn respectively.
Figure 22:
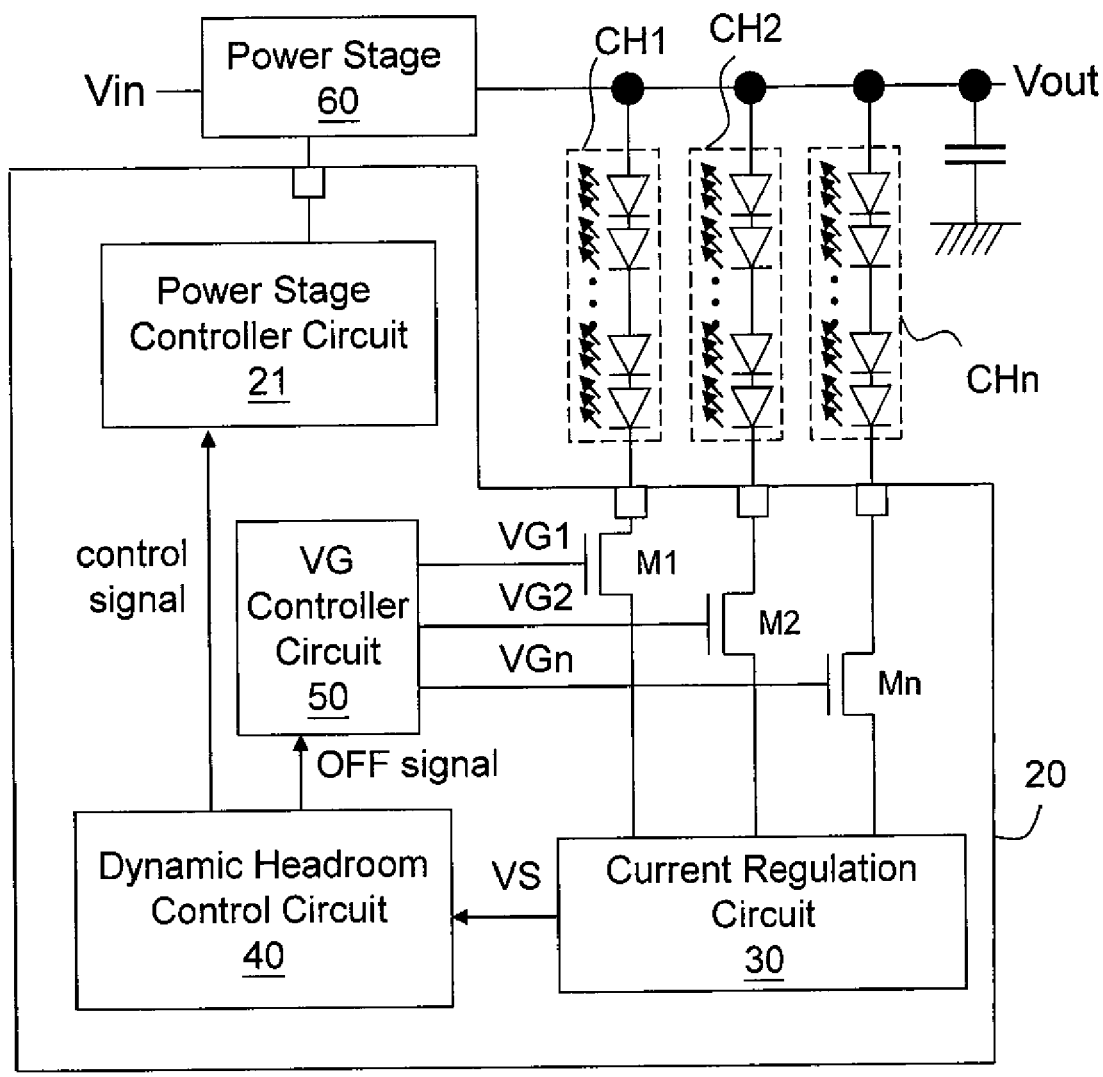
FIG. 22 shows another embodiment of a light emitting device controller circuit of the present invention.

When short-circuit occurs in any of the LED channels, if it is desired to disconnect the corresponding LED channel individually, in one embodiment as shown in FIG. 21, a VG controller circuit 50 may be provided, which generates signals VG1-VGn to control the transistors M1-Mn respectively. The OFF signal generated by the dynamic headroom controller circuit 40 is sent to the VG controller circuit 50, which generates a corresponding signal VG1-VGn according to the OFF signal to turn off the corresponding transistor M1-Mn in the short-circuited LED channel, so that the LED channel is open-circuited. Certainly, this method is also applicable to an embodiment which places the transistors M1-Mn inside the integrated circuit 20, as shown in FIG. 22.

Figure 23:
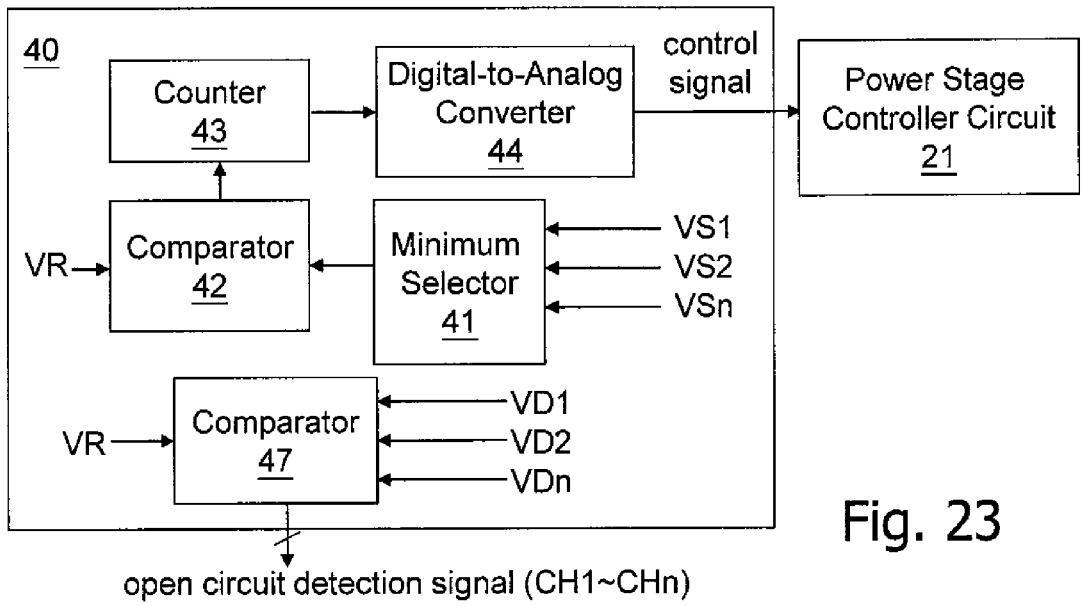
FIG. 23 shows the dynamic headroom controller circuit 40 may further comprise a comparator 47 to determine whether an open circuit occurs in any LED string.
Figure 24:
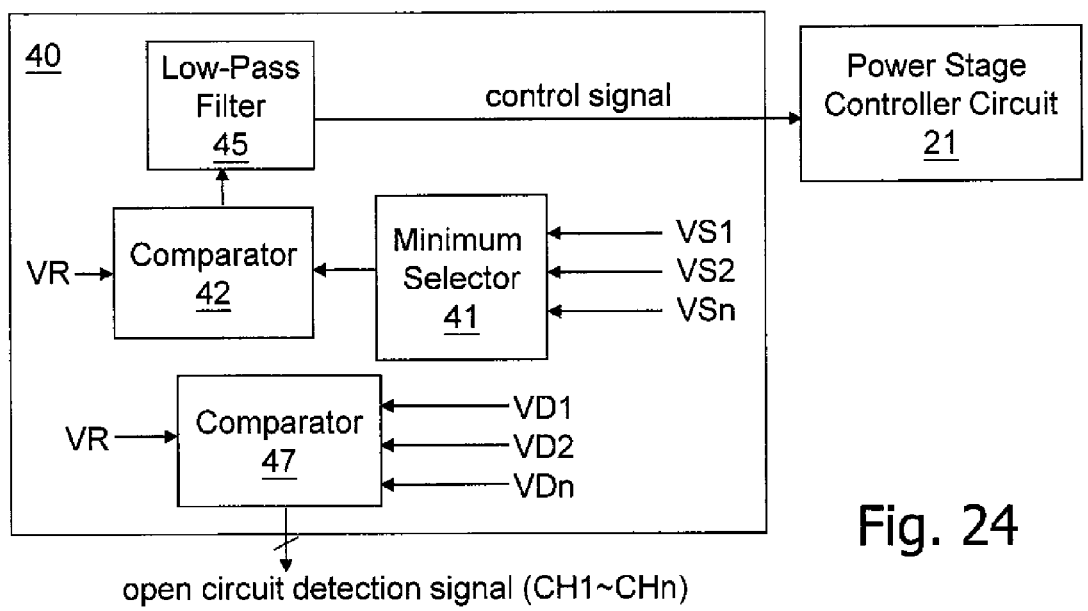
FIG. 24 shows another embodiment of dynamic headroom controller circuit 40 of the present invention.

In addition, according to the determination mechanism (3), as shown in FIGS. 23-24, the dynamic headroom controller circuit 40 may further include an open circuit detection circuit 47, one embodiment of which is a comparator, for comparing the voltage VD1-VDn with the voltage VR, wherein when VG>VH and VD<VR (VD represents any one of the drain voltages VD1-VDn), the corresponding LED channel CH1-CHn is open-circuited.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, the transistor switches M1-Mn can be NMOS transistors or PMOS transistors. As another example, the light emitting device does not have to be LED, but can be any light emitting device whose brightness is controlled by current. As yet another example, the present invention is not limited to the application where there are multiple LED channels, but also can be used in applications with a single LED channel; in this case the minimum selector 41 is not required in the dynamic headroom controller circuit 40. As yet another example, the current source circuits CS1-CSn integrated in the integrated circuit 20 can be any types of current source circuits; for example, the MOS transistors Q1-Qn can be replaced by bipolar transistors (SJTs). In view of the foregoing, the spirit of the present invention should cover all such and other modifications and variations, which should be interpreted to fall within the scope of the following claims and their equivalents.

What is claimed is:

1. A light emitting device controller circuit comprising:
   a power stage controller circuit controlling a power stage circuit to convert an input voltage to an output voltage, the output voltage being supplied to at least one light emitting device channel which includes at least one light emitting device;
   a transistor switch in the light emitting device channel, the transistor switch receiving a control voltage VG;
   a current source circuit controlling a current through the light emitting device channel, the current source requiring a minimum operation voltage VR for normal operation; and
   a dynamic headroom controller circuit comparing a voltage VS at a current outflow end of the transistor switch and the voltage VR to determine a relationship between the voltage VS and the voltage VR when the control voltage VG is higher than a reference voltage VH, so that a control signal is generated for controlling the power stage controller circuit to adjust the output voltage.

2. The light emitting device controller circuit of claim 1, wherein the output voltage is provided to at least two light emitting device channels and the dynamic headroom controller circuit includes:
   a minimum selector selecting a minimum voltage from the voltages VS at the current outflow ends of the transistor switches in the light emitting device channels;
   a comparator comparing the minimum voltage selected by the minimum selector with the voltage VR;
   a counter counting the comparison result of the comparator; and
   a digital-to-analog converter converting the count by the counter to the control signal for controlling the power stage controller circuit.

3. The light emitting device controller circuit of claim 2, wherein the counter is an up/down counter.

4. The light emitting device controller circuit of claim 2, wherein the comparator is a hysteresis comparator.

5. The light emitting device controller circuit of claim 1, wherein the output voltage is provided to at least two light emitting device channels and the dynamic headroom controller circuit includes:
   a minimum selector selecting a minimum voltage from the voltages VS at the current outflow ends of the transistor switches in the light emitting device channels;
   a comparator comparing the minimum voltage selected by the minimum selector with the voltage VR; and
   a low-pass filter converting the count by the counter to the control signal for controlling the power stage controller circuit.

6. The light emitting device controller circuit of claim 5, wherein the comparator is a hysteresis comparator.

7. The light emitting device controller circuit of claim 1, wherein the dynamic headroom controller circuit further comprises a short circuit detection circuit for comparing a voltage VS at the current outflow end of the transistor switch with the reference voltage VH to determine whether a short circuit occurs in the light emitting device channel.

8. The light emitting device controller circuit of claim 7, wherein the output voltage is provided to at least two light emitting device channels and the light emitting device controller circuit further includes a voltage controller circuit providing the control voltage VG respectively to the transistor switches on the light emitting device channels, wherein when a short circuit occurs in any one of the light emitting device channels, the voltage controller circuit turns off the corresponding transistor switch in the short-circuited light emitting device channel.

9. The light emitting device controller circuit of claim 1, wherein the reference voltage VH is at a level between the output voltage and a voltage VD at a current inflow end of the transistor switch.

10. The light emitting device controller circuit of claim 1, wherein the dynamic headroom controller circuit further comprises an open circuit detection circuit for comparing a voltage VD at a current inflow end of the transistor switch with the voltage VR to determine whether an open circuit occurs in the light emitting device channel.

11. A method for controlling a light emitting device in a light emitting device channel, comprising:
    providing a transistor switch in the light emitting device channel, the transistor switch receiving a control voltage VG;
    providing a current source circuit to control a current through the light emitting device channel, the current source requiring a minimum operation voltage VR for normal operation;
    causing the control voltage VG to be higher than a reference voltage VH;
    determining a relationship between a voltage VS at the current outflow end of the transistor switch and the voltage VR; and
    adjusting a voltage supplied to the light emitting device channel according to the determination result.

12. The method of claim 11, further comprising: comparing the voltage VS at the current outflow end of the transistor switch with the reference voltage VH to determine whether a short circuit occurs in the light emitting device channel.

13. The method of claim 11, wherein the reference voltage VH is at a level between the voltage supply and a voltage VD at a current inflow end of the transistor switch.

14. The method of claim 11, further comprising: comparing a voltage VD at a current inflow end of the transistor switch with the voltage VR to determine whether an open circuit occurs in the light emitting device channel.

15. An integrated circuit for use in a light emitting device controller circuit which controls at least one light emitting device channel, the channel including at least one light emitting device and one transistor switch coupled to the light emitting device, the transistor switch receiving a control voltage VG, wherein the light emitting device controller circuit includes a power stage circuit, the integrated circuit comprising:
    a power stage controller circuit controlling the power stage circuit to convert an input voltage to an output voltage which is supplied to the at least one light emitting device channel;
    a current source circuit controlling a current through the light emitting device channel, the current source requiring a minimum operation voltage VR for normal operation; and
    a dynamic headroom controller circuit comparing a voltage VS at the current outflow end of the transistor switch and the voltage VR to determine a relationship between the voltage VS and the voltage VR when the control voltage VG is higher than a reference voltage VH, so that a control signal is generated for controlling a power stage controller circuit to adjust the output voltage.

16. The integrated circuit of claim 15, wherein the output voltage is provided to at least two light emitting device channels and the dynamic headroom controller circuit includes:

a minimum selector selecting a minimum voltage from the voltages VS at the current outflow ends of the transistor switches in the light emitting device channels;

a comparator comparing the minimum voltage selected by the minimum selector with the voltage VR;

a counter counting the comparison result; and a digital-to-analog converter converting the count by the counter to the control signal for controlling the power stage controller circuit.

17. The integrated circuit of claim 16, wherein the counter is an up/down counter.

18. The integrated circuit of claim 16, wherein the comparator is a hysteresis comparator.

19. The integrated circuit of claim 15, wherein the output voltage is provided to at least two light emitting device channels and the dynamic headroom controller circuit includes:

a minimum selector selecting a minimum voltage from the voltages VS at the current outflow ends of the transistor switches in the light emitting device channels;

a comparator comparing the minimum voltage selected by the minimum selector with the voltage VR; and a low-pass filter converting the count by the counter to the control signal for controlling the power stage controller circuit.

20. The integrated circuit of claim 19, wherein the comparator is a hysteresis comparator.

21. The integrated circuit of claim 15, wherein the reference voltage VH is at a level between the output voltage and a voltage VD at the current inflow end of the transistor switch.

22. The integrated circuit of claim 15, wherein the dynamic headroom controller circuit further comprises a short circuit detection circuit for comparing a voltage VS at the current outflow end of the transistor switch with the reference voltage VH to determine whether a short circuit occurs in the light emitting device channel.

23. The integrated circuit of claim 22, wherein the output voltage is provided to at least two light emitting device channels and the light emitting device controller circuit further includes a voltage controller circuit providing the control voltage VG respectively to the transistor switches on the light emitting device channels, wherein when a short circuit occurs in any one of the light emitting device channels, the voltage controller circuit turns off the corresponding transistor switch in the short-circuited light emitting device channel.

24. The integrated circuit of claim 15, wherein the dynamic headroom controller circuit further comprises an open circuit detection circuit for comparing a voltage VD at a current inflow end of the transistor switch with the voltage VR to determine whether an open circuit occurs in the light emitting device channel.

* * * * *